H. H. CULMER.
NON-PUNCTURABLE TIRE.
APPLICATION FILED OCT. 9, 1917.
1,310,113.
Patented July 15, 1919.
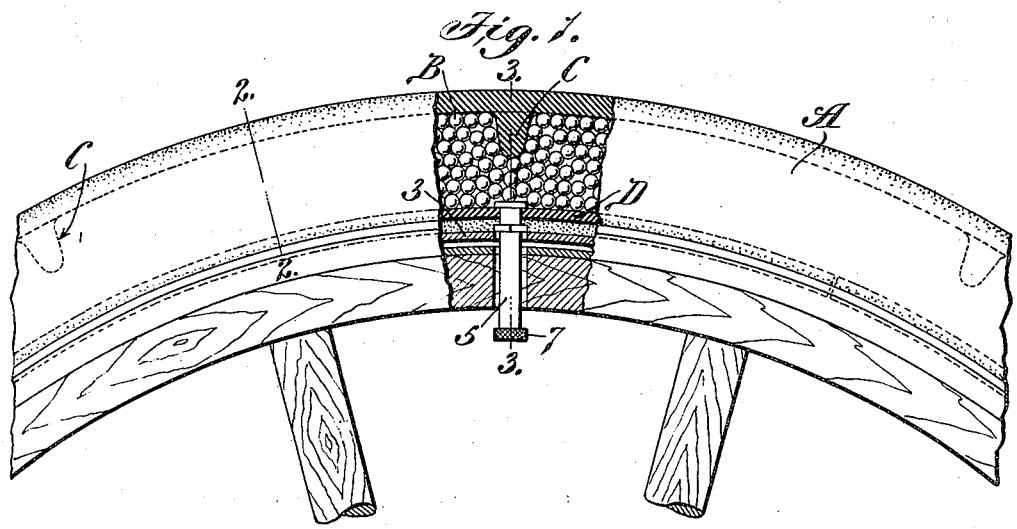
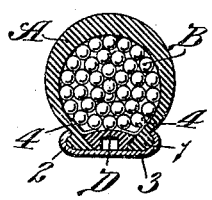
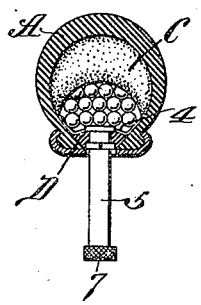
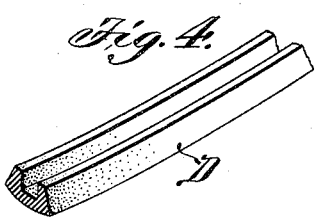
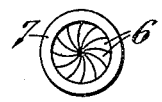
Inventor,
Harry H. Culmer.
By Bakewell & Church Attys.

UNITED STATES PATENT OFFICE.

HARRY H. CULMER, OF CHICAGO, ILLINOIS.

NON-PUNCTURABLE TIRE.

1,310,113.      Specification of Letters Patent.      Patented July 15, 1919.

Application filed October 9, 1917. Serial No. 195,529.

*To all whom it may concern:*

Be it known that I, HARRY H. CULMER, a citizen of the United States, residing at Chicago, Illinois, have invented a certain new and useful Improvement in Non-Puncturable Tires, of which the following is a full, clear, and exact description, such as will enable others skilled in the art to which it appertains to make and use the same.

This invention relates to non-puncturable wheel tires of the type that comprise an outer casing which is filled with a resilient medium or substance other than air.

The main object of my invention is to provide a wheel tire of the general type referred to that will effectively absorb shocks and jars and which is so constructed that the resilient medium or substance which fills the outer casing will not break down or become defective after long and continuous use.

Another object is to provide a wheel tire of the general type referred to which is so constructed that the degree of resiliency of the tire can be varied easily.

And still another object is to provide a tire of the general type referred to which comprises a novel and efficient means for locking the outer casing to the rim of the wheel on which the tire is used. Other objects and desirable features of my invention will be hereinafter pointed out.

To this end I have devised a wheel tire that consists of an outer casing or pliable shell of any preferred construction that is filled with a large number of relatively small resilient bodies or objects which are packed tightly together so as to substantially completely fill the casing, and thus produce an inner core for the casing. Said core imparts sufficiently stability to the casing to prevent the casing from collapsing when it is subjected to a load, and as said core is made up of a large number of relatively small resilient objects which are capable of moving relatively to each other when the casing comes in contact with a projection, obstruction or uneven surface in the road over which the tire is traveling, the shock or jar will be effectively absorbed by the core. In other words, in my improved tire the shocks and jars are absorbed, not solely by the resiliency of the core, but by the combined displacement or relative movement of the small members that constitute the core and the inherent resiliency of said members. I am, of course, aware of the fact that wheel tires have heretofore been made consisting of an outer casing filled with a resilient molded core formed either in one piece or in segments, which core, in cross-sectional shape, conforms to the inner contour of the outer casing. The tires of the kind referred to have not the required resiliency, due to the fact that resiliency is derived solely from the elasticity of the substance from which the core is formed and they do not stand up successfully under long and continuous use, due to the fact that the heat, pressure and continuous flexing to which the core is subjected when the tire is in use causes the core to disintegrate. My improved tire is distinguished from tires of the kind just referred to, in that the core is made up of a large number of objects or bodies, which, in addition to being resilient, are of such form and arrangement that they can shift or move relatively to each other, thus effectively absorbing the shocks and jars produced by the outer casing coming in contact with an obstruction or uneven surface in the road over which the tire is traveling. It is an improvement upon such tires, in that it absorbs the shocks and jars more effectively and also because the core is practically indestructible and is of such a character that the elasticity or degree of resiliency of the tire can be changed easily by simply varying the number of resilient objects or bodies that are introduced into the casing of the tire to form the core of same.

Figure 1 of the drawings is a side elevational view, partly in section, of a wheel tire constructed in accordance with my invention.

Fig. 2 is a cross-sectional view, taken on the line 2—2 of Fig. 1.

Fig. 3 is a view, partly in cross section, taken on the line 3—3 of Fig. 1.

Fig. 4 is a perspective view of a portion of the key that is used to lock the outer casing on the rim of the wheel; and Fig. 5 is a top plan view of the filling device through which the resilient bodies or objects are introduced into the casing of the tire.

Referring to the drawings which illustrate the preferred form of my invention, A designates the casing or outer shell of my improved tire, and B designates small resilient bodies or objects that are packed tightly in the casing A so as to substantially completely fill the interior of the casing. The outer casing A may be of any preferred construction or type, such, for example, as a member of tubular shape in cross section or a substantially tubular-shaped member split longitudinally on its inner side and provided with beads or other suitable means for securing it to the wheel on which the tire is mounted. I prefer to use an outer casing of similar form to the outer casings that are used in pneumatic tires, which casing consists of a substantially tubular-shaped member that is split longitudinally on its inner side and provided with beads 1 that are adapted to be engaged by flanges 2 on a demountable rim 3 that surrounds the metal band on the felly of the wheel on which the tire is used. The resilient objects or bodies B that constitute the core of the tire may be of any suitable shape, but I prefer to use substantially round or spherical-shaped members formed from rubber or other suitable material and which are of such size that a large number of same can be packed snugly inside of the casing A, so as to produce an inner core that conforms to the contour of the inner side of the casing, but which has numerous interstices or spaces that permit the objects B to shift or move relatively to each other, and thus partially absorb the shocks and jars to which the tire is subjected, the shocks and jars also being absorbed partly by the resiliency of the material from which the members B are formed.

If desired, the outer casing A may be provided with baffles C, as shown in Figs. 1 and 3, that prevent the resilient bodies B at the lower side of the tire from being crowded upwardly into the sides and upper portion of the tire when the tire is standing or at rest. In the form of my invention herein shown the baffles C are so proportioned that they do not completely destroy the continuity of the inner space of the casing. Said baffles C can be of any preferred shape, however, and they can be formed integral with the outer casing A, or connected to said outer casing in any other suitable manner. Any suitable means can be used for securing the outer casing A to the rim of the wheel on which the tire is used, but the means that I prefer to use for this purpose consists of a substantially wedge-shaped key D that is arranged between the two side edge portions of the outer casing A, as shown in Fig. 2, so as to hold the beads 1 on said casing in snug engagement with the flanges 2 on the rim of the wheel, said locking key D being retained securely in operative position by the pressure which the core of the tire exerts on said key. If desired, the locking key D can be provided with flaps 4, as shown in Fig. 2, that lap over the side wall portions of the casing A, so as to prevent dirt from working into the interior of the casing A through the joints between said casing and the locking key D.

If the casing is provided with baffles C of the kind herein shown, which are of less depth than the diameter of the inner space of the casing A, one filling opening is sufficient to enable the resilient objects B to be introduced into the casing and removed therefrom. In the embodiment of my invention herein illustrated the filling opening just referred to is formed by a tubular-shaped member 5 which is connected in any suitable manner to the locking key D, the inner end of said tube 5 being open and communicating with the interior of the casing A. The objects B are introduced into the casing A by forcing them inwardly through the tube 5. The tube 5 projects through the demountable rim 3 and through the felly and felly band of the wheel, as shown in Fig. 1, and the outer end of said tube is closed by any suitable kind of closure, the closure that I prefer to use being similar to a shutter of the so-called "iris" type, which comprises leaves 6 that can be moved into its closed position shown in Fig. 5 by turning a ring 7 at the outer end of the tube 5 and which can be opened by turning said ring in the opposite direction.

In applying the tire to a wheel, the outer casing A with the locking wedge D assembled inside of same is first arranged in operative position on the rim of the wheel with the beads 1 on said casing in engagement with the flanges 2 on said rim, and thereafter the resilient members B are introduced into the casing through the tube 5, so as to substantially completely fill the interior of the casing, a sufficient number of said members B being crowded into the casing until the casing has attained sufficient stability to carry the load and also sufficient elasticity or resiliency to effectively absorb the shocks and jars to which the casing will be subjected when it is in service. If a comparatively hard tire having little resiliency is desired, enough resilient members B are forced into the casing A to produce a core whose component parts are wedged tightly together. If a tire having considerable resiliency is desired, fewer resilient members B are introduced into the casing A. It will thus be seen that by varying the number of resilient members B that are introduced into the casing the elasticity or resiliency of the tire can be easily changed. Furthermore, this variation or degree in the resiliency of the tire can be effected without removing the tire from the wheel, and moreover, by any person of ordinary intelligence, as it is only necessary to remove or open the closure for the tube 5 and introduce additional members B into the casing or remove some of the members B from the casing. This is a very desirable feature of my improved tire, as it enables the tire to be maintained at a certain resiliency by adding additional members B from time to time as the members B in the casing become reduced, due to the wear occasioned by the frictional contact of said members on each other and on the casing. My improved tire is non-puncturable; it has the easy riding qualities of a pneumatic tire and it can be used for a long period, due to the fact that the core is practically indestructible and is of such a character that it will not break down or disintegrate.

Having thus described my invention, what I claim, and desire to secure by Letters Patent, is:

A wheel tire, consisting of an outer casing, an inner core in said casing composed of a large number of relatively small resilient objects packed tightly together, and transversely-disposed baffles arranged inside of said casing and integrally connected to same, for the purpose described.

HARRY H. CULMER.

Copies of this patent may be obtained for five cents each, by addressing the "Commissioner of Patents, Washington, D. C."